United States Patent
Gondalia et al.

(10) Patent No.: US 10,628,129 B2
(45) Date of Patent: Apr. 21, 2020

(54) INTELLECTUAL AUTOMATED SECURITY, PERFORMANCE AND CODE GENERATION FRAMEWORK

(71) Applicant: Accenture Global Solutions Limited, Dublin (IE)

(72) Inventors: Ashvin Gondalia, Gandhinagar (IN); Sunjeet Gupta, Pune (IN); Parikshit Maniar, Bangalore (IN); Shridhar D. Rajgopalan, Bangalore (IN); Prateek Shrivastav, Pune (IN); Meghashyam Vishwanath Sawant, Pune (IN); Kulshrestha Ashwani, Pune (IN); Gade Sanjay Gaurav, Pune (IN); Sumit Alawat, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/722,280

(22) Filed: Oct. 2, 2017

(65) Prior Publication Data

US 2019/0050319 A1     Feb. 14, 2019

(30) Foreign Application Priority Data

Aug. 8, 2017    (IN) .............................. 201711028121

(51) Int. Cl.
    *G06F 8/33*       (2018.01)
    *G06N 20/00*    (2019.01)
    (Continued)

(52) U.S. Cl.
    CPC ............ *G06F 8/33* (2013.01); *G06F 11/3616* (2013.01); *G06F 11/3664* (2013.01); *G06F 17/27* (2013.01); *G06N 20/00* (2019.01)

(58) Field of Classification Search
    CPC .................................................. G06F 11/3616
                      (Continued)

(56) References Cited

U.S. PATENT DOCUMENTS

| | | | |
|---|---|---|---|
| 2004/0006459 A1* | 1/2004 | Dehlinger | G06F 16/353 704/10 |
| 2005/0055565 A1* | 3/2005 | Fournet | G06F 21/577 726/26 |

(Continued)

OTHER PUBLICATIONS

Rahman et al., "RACK: Code Search in the IDE using Crowdsourced Knowledge", Jul. 3, 2017, Proceedings of the 39th International Conference on Software Engineering Companion. IEEE Press, Piscataway, NJ, USA. (Year: 2017).*

(Continued)

*Primary Examiner* — James D. Rutten
(74) *Attorney, Agent, or Firm* — Fish & Richardson P.C.

(57) ABSTRACT

Implementations directed to providing a computer-implemented method for automating analytical model building for code snippets, the method comprising receiving software instructions indicating functionality of a software component, analyzing the software instructions through natural language processing to identify tags to characterize the software instructions and the functionality, performing a search, based on the identified tags, of relevant Internet sites to identify code snippets that address the functionality, scoring one or more of the identified code snippets based on a respective relevance to the functionality, based on the scoring of the one or more of the identified code snippets, determining that at least one of the code snippets has a score that meets a relevance threshold, and providing the at least one of the code snippets based on the determination that the at least one of the code snippets has the score that meets the relevance threshold.

20 Claims, 5 Drawing Sheets

(51) Int. Cl.
*G06F 11/36* (2006.01)
*G06F 17/27* (2006.01)

(58) Field of Classification Search
USPC .......................................................... 717/126
See application file for complete search history.

(56) References Cited

U.S. PATENT DOCUMENTS

| | | | | |
|---|---|---|---|---|
| 2007/0112764 | A1* | 5/2007 | Yih | G06F 17/241 |
| 2009/0222429 | A1* | 9/2009 | Aizenbud-Reshef | G06F 8/36 |
| 2012/0079452 | A1* | 3/2012 | Nir-Buchbinder | G06F 8/33 717/113 |
| 2013/0174117 | A1* | 7/2013 | Watters | G06F 11/3664 717/106 |
| 2014/0172707 | A1* | 6/2014 | Kuntagod | G06Q 20/40145 705/44 |
| 2015/0074095 | A1* | 3/2015 | Enders | G06F 17/27 707/725 |
| 2015/0135166 | A1* | 5/2015 | Tarlow | G06F 8/34 717/125 |
| 2016/0357519 | A1* | 12/2016 | Vargas | G06F 9/451 |
| 2019/0227774 | A1* | 7/2019 | Banuelos | G06F 8/33 |
| 2019/0332968 | A1* | 10/2019 | Fu | G06F 8/30 |

OTHER PUBLICATIONS

T. Diamantopoulos, G. Karagiannopoulos and A. Symeonidis, "CodeCatch: Extracting Source Code Snippets from Online Sources," 2018 IEEE/ACM 6th International Workshop on Realizing Artificial Intelligence Synergies in Software Engineering (RAISE), Gothenburg, 2018, pp. 21-27. (Year: 2018).*

Luca Ponzanelli et al., "Seahawk: Stack Overflow in the IDE," Software Engineering, IEEEPress, University of Lugano, May 18, 2013, pp. 1295-1298.

European search Report for Application No. 17194807, dated Apr. 17, 2018, 7 pages.

* cited by examiner

INTELLECTUAL AUTOMATED SECURITY, PERFORMANCE AND CODE GENERATION FRAMEWORK

CROSS-REFERENCE TO RELATED APPLICATION

This application claims priority to Indian Provisional Patent Application No. 201711028121, filed on Aug. 8, 2017, entitled "INTELLECTUAL AUTOMATED SECURITY, PERFORMANCE AND CODE GENERATION FRAMEWORK," the entirety of which is hereby incorporated by reference.

BACKGROUND

The need for rapid turnaround of newly developed and/or maintenance updates for enterprise applications and systems is increasing. To meet this demand, an enterprise must develop and deploy these applications (and/or systems) in shorter time frames. Additionally, security and performance testing for each application must also be built/updated and deployed into the overall solutions within the respective time frame. Consequently, developers of these applications face challenges in promptly responding to these business changes with an appropriate and robust solution.

SUMMARY

Implementations of the present disclosure are generally directed to automating analytical model building for code snippets. More specifically, implementations are directed to an intellectual automated Security, Performance and Code generation (iSPAC) framework for seamless development, deployment, and testing of features in an application and/or system development life-cycle.

In some implementations, actions include receiving, from an integrated development environment (IDE), software instructions indicating functionality of a software component, analyzing the software instructions through natural language processing (NLP) to identify tags to characterize the software instructions and the functionality, performing a search, based on the identified tags, of relevant Internet sites to identify code snippets that address the functionality, scoring one or more of the identified code snippets based on a respective relevance to the functionality, based on the scoring of the one or more of the identified code snippets, determining that at least one of the code snippets has a score that meets a relevance threshold, and providing, to the IDE, the at least one of the code snippets based on the determination that the at least one of the code snippets has the score that meets the relevance threshold. Other implementations of this aspect include corresponding systems, apparatus, and computer programs, configured to perform the actions of the methods, encoded on computer storage devices.

These and other implementations can each optionally one or more of the following actions: receiving, from the IDE, a selection of the provided at least one of the code snippets; based on receipt of the selection, persisting, in a rules database, the selected code snippet; receiving second software instructions indicating second functionality of a second software component; analyzing the second software instructions through NLP to identify second tags to characterize the second software instructions and the second functionality; performing a second search, based on the identified second tags, of the rules database to identify previously selected code snippets that perform the functionality; scoring one or more of the identified previously selected code snippets based on a respective relevance to the second functionality; based on the scoring of the one or more of the identified previously selected code snippets, determining that at least one of the previously selected code snippets has a score that meets a relevance threshold; and providing, to the IDE, the at least one of the previously selected code snippets based on the determination that the at least one of the previously selected code snippets has the score that meets the relevance threshold; updating the threshold based on the persistence of the selected code snippet in the rules database; updating the software component with the code snippet having a most relevant score for addressing the security vulnerability; receiving, from the IDE, a selection of the provided at least one of the code snippets; updating the software component with the selected code snippet; and persisting, in a rules database, the selected code snippet for use in subsequent searches.

These and other implementations can each optionally include one or more of the following features: the software instructions are received based on the software component being checked in to a source code repository associated with the IDE, wherein the functionality of the software component indicates a security vulnerability of the component, and wherein the identified code snippets are directed to fixing the vulnerability; the software instructions are in natural language and include a specific annotation of the functionality; performing the search of relevant Internet sites to identify code snippets that address the functionality comprises performing a search to identify code snippets that perform the functionality; the software instructions are code blocks and wherein performing the search of relevant Internet sites to identify code snippets that address the functionality comprises performing a search to identify code snippets that identify vulnerabilities in the functionality.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Software development is the process of computer programming, documenting, testing, and bug fixing involved in creating and maintaining applications, systems, and frameworks resulting in a software product. Within software development, automatic programming or source code generation identifies a type of computer programming in which some mechanism generates a computer program or portion of a computer program to allow developers to write code at a higher abstraction level. For example, source code may be generated based on an ontological model such as a template and may be accomplished with a programming tool such as a template processor or an integrated development environment (IDE). These tools allow the generation of source code through various means.

Additionally, a key challenge in software development is security testing or Software Security Assurance (SSA). SSA is the process of ensuring that software is designed to operate at a level of security that is consistent with the potential harm that could result from the loss, inaccuracy, alteration, unavailability, or misuse of the data and resources that it uses, controls, and protects. Code analysis and security testing have progressed rapidly over the past few years. However, the development of "secure" software is not an easy task as the proliferation of tools, the struggle to trim down the number of alerts, and the lack of support for some software frameworks and programming languages all conspire to make adding security testing to software development a challenge. Moreover, with the growing trend of malicious security type attacks and the ever real-time changes in the security threats, there needs to be a learning and intellectual system to manage and secure software application and/or systems.

In view of the foregoing, implementations of the present disclosure are generally directed to an iSPAC framework, which features new generation self-learning employed in both code and security testing module generation for seamless development, deployment, and testing of features in an application and/or system development life-cycle. The iSPAC framework includes support for developers and organizations to increase productivity by improving software quality while decreasing development lifecycles and overall costs. For example, the iSPAC framework provides an automated and smart learning architecture that provides for continuous development and deployment of code and security modules to meditate threat management. Artificial intelligence modules detect and categorize the type of code to be generated by and/or the code to be tested through the iSPAC framework. By applying machine learning, applicable code snippets may be generated and existing vulnerabilities and relevant fixes identified. In certain examples, a code snippet is a section of text or source code that can be inserted into the code of a computer program or Web page. Furthermore, code generation and vulnerability detection static stores may be continuously enriched through a machine learning process that filters and scores relevant Internet content. Additionally, the iSPAC framework may integrate with well-known IDEs, such as Eclipse, Intelli J, JDeveloper, Netbeans, for accelerated development and quality automations with performance rules, scan-fix, and auto discovery of security rules with static and runtime security.

Figure 1:
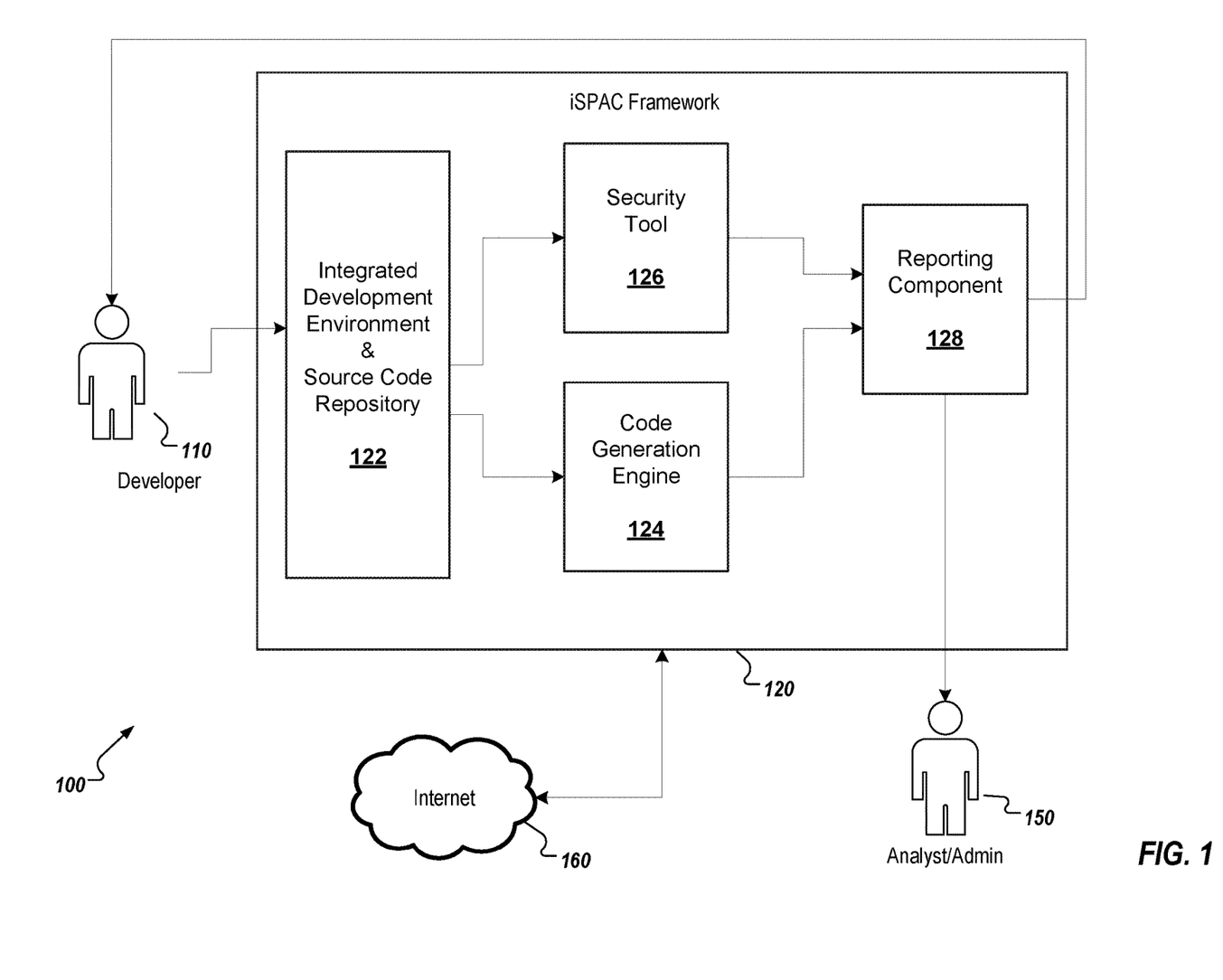
FIG. 1 depicts an example system that employs the iSPAC framework.

FIG. 1 depicts an example system 100 that employs the iSPAC framework 120. The example system 100 includes developer(s) 110, iSPAC Framework 120, analyst/administrator 150 and a link to the Internet 160. iSPAC Framework 120 includes integration with developer box and source code repository 122, code generation engine 124, security tool 126, and reporting component 128. In the depicted example, the iSPAC framework 120 may be deployed to any special purpose computer system. The example system may be provided using one or more computing device(s) of any suitable number and type of computing device. Configuration of such computing devices include shared, virtual, managed/dedicated, cluster/grid, cloud based resources, and/or any combination thereof and provides accesses to developers 110 and analyst/administrator 150 through a network (not shown). In the depicted system 100, developer 110 may analyze requirements for an application or system and then design, develop, and test software by applying the theories and principles of computer science and mathematical analysis aided by the iSPAC framework 120. Analyst/administrator 150 may generate and/or receive reports from reporting component 128 to, for example, provide system or vulnerabilities analysis to various business and/or technical units within a respective enterprise.

Integrated development environment and source code repository component 122 integrates with developer's 110 developer box (machine) through the IDE and source code repository that developer 110 employs for application and/or system development. In some implementations, code generation tool 124, and security tool 126 are provided through plugins for the developer's IDE. Developer 110 may route instructions through or receive information from a provided menu and/or commands, such as click command, to identify auto generated codes and security modules available through the iSPAC framework 120. The provided interface allows developer 110 to select particular code to automatically generate through the iSPAC framework 120.

Code generation engine module 124 generates boiler plate code for application or system components, such as user interface (UI) or server side code, based on requirement provided by developer 110 through the integrated development environment 122. In some implementations, code generation engine 124 receives software instructions indicating a functionality of a software component in the form of plaintext code requirements from the integrated development environment 122. Code generation engine 124 may categorize the received information into a code category. Based on the determined code category, the iSPAC framework displays various relevant examples and/or template code to the developer 110 through the integrated development environment 122. The displayed relevant examples are determined through a machine learning process that processes stored information and/or relevant searches on the Internet 160, which are scored and compared to a determinable threshold. Based on the developers 110 selections, code generation engine 124 automatically generates the code snippets (i.e., baseline/template code) for the provided functionality and requirements, which are provided to developer 110. Additionally, code generation engine 124 persists the generated code snippets along with the relevant meta information to use in future code generation scenarios. Code generation engine module 124 is described in greater detail in FIG. 2.

Security tool 126 provides support for security scanning of application and systems that are live in production or testing environment to detect anomalies or problems. Security tool 126 also analyzes software instructions indicating a functionality of a software component in the form of source code provided through the code generation engine module 124 for potential security vulnerabilities. In various implementations, an interaction UI provides the analyst/administrator 150 with access to any problems and incidents detected by the system. The security tool 126 may also provide alerts to analyst/administrator 150 for any anomalies detected through the interaction UI or via a messaging protocol, such as Short Message Service (SMS) or Simple Mail Transfer Protocol (SMTP). Each detected anomaly and/or incident may be persisted to analyze potential security threat patterns and for statistical report generation within report component 128. Additionally, security tool 126 employs machine learning to process stored information and/or relevant searches on the Internet 160 to provide solutions for detected security threats and to facilitate with developer 110 the decreasing the threat of security vulnerabilities in existing source code through the integrated development environment 122. Security tool 126 is described in greater detail in FIG. 3.

Reporting component 128 provides analytics and access to reporting features to developer 110 and analyst/administrator 150. For example, reporting component 128 persists an entry in a reporting database, which allows developer 110 and analyst/administrator 150 access to reports on which templates and codes are more frequently used within a given application or system. Additionally, as described above, code generated through the integrated development environment 122 may be updated within reporting component 128 to allow the reporting component 128 to cater any future requirements from the code generation engine 124. For example, code generation engine 124 may review historical data stored in the reporting component 128 to suggest code snippet or templates. Likewise, security tool 126 may review historical data to provide security improvements to existing source code. Reporting component 128 is described in greater detail in relation to code generation engine 124 in FIG. 2 and security tool 126 in FIG. 3.

Figure 2:
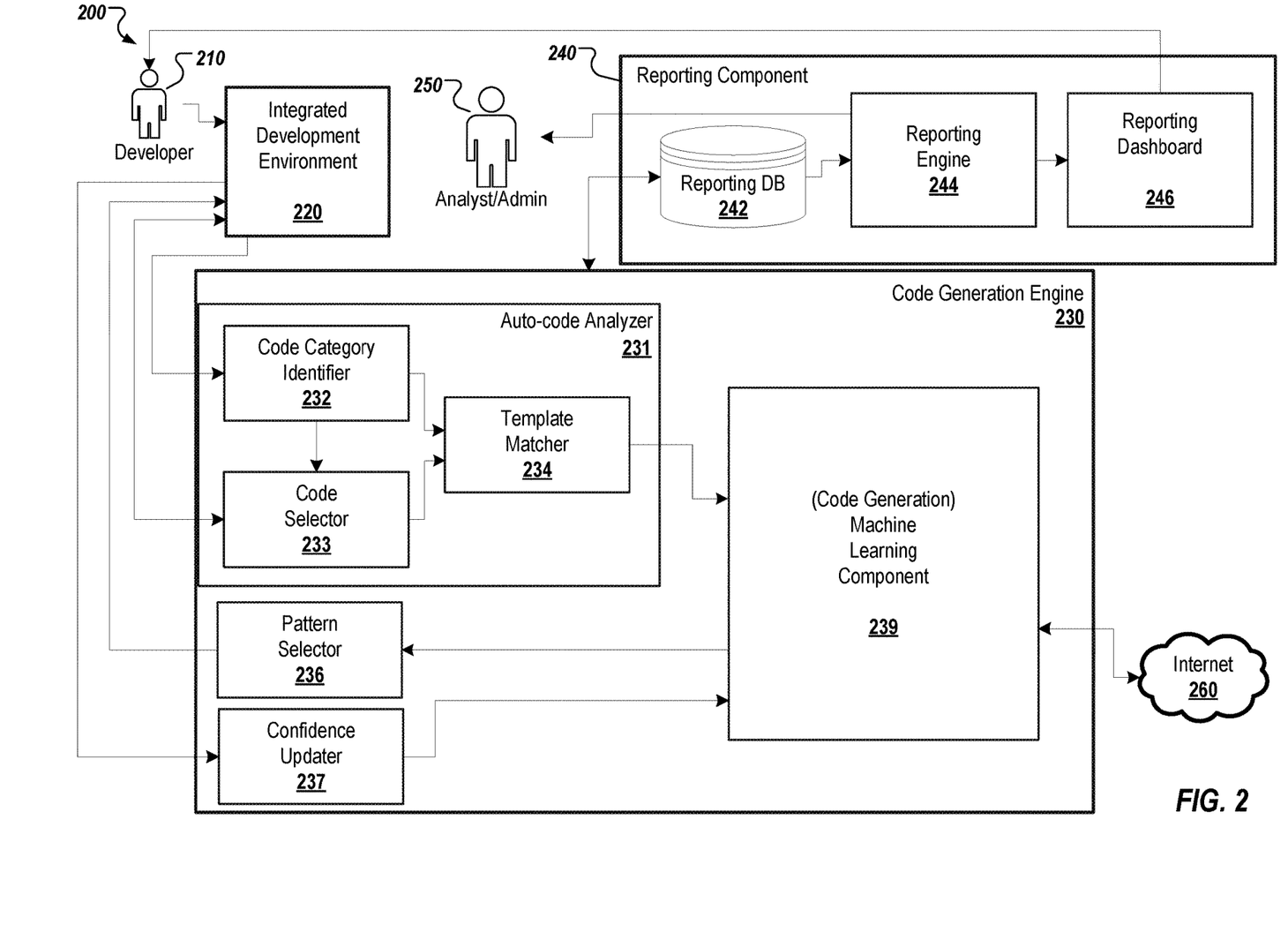
FIG. 2 depicts an another example system that employs the iSPAC framework.

FIG. 2 depicts an example system 200 that employs the iSPAC framework. The example system 200 includes components and actors that are substantially similar and function in a similar manner to the components of system 100 such as developer 210, integrated development environment 220, code generation engine 230, reporting component 240, analyst/administrator 250, and a link to the Internet 260. In depicted example, code generation engine 230 includes auto-code analyzer module 231, which includes the submodules code category identifier 232, code selector 233, and template matcher 234; pattern selector module 236, confidence module 237, and machine learning component 239. In some implementations, code category identifier 232 identifies from a provided archetype the possible categories the complete code package may be based on and code selector 233 provides and receives annotation to/from the development environment 220. Template matcher 234 provides the provided archetype and annotation(s) to machine learning component 239.

Figure 3:
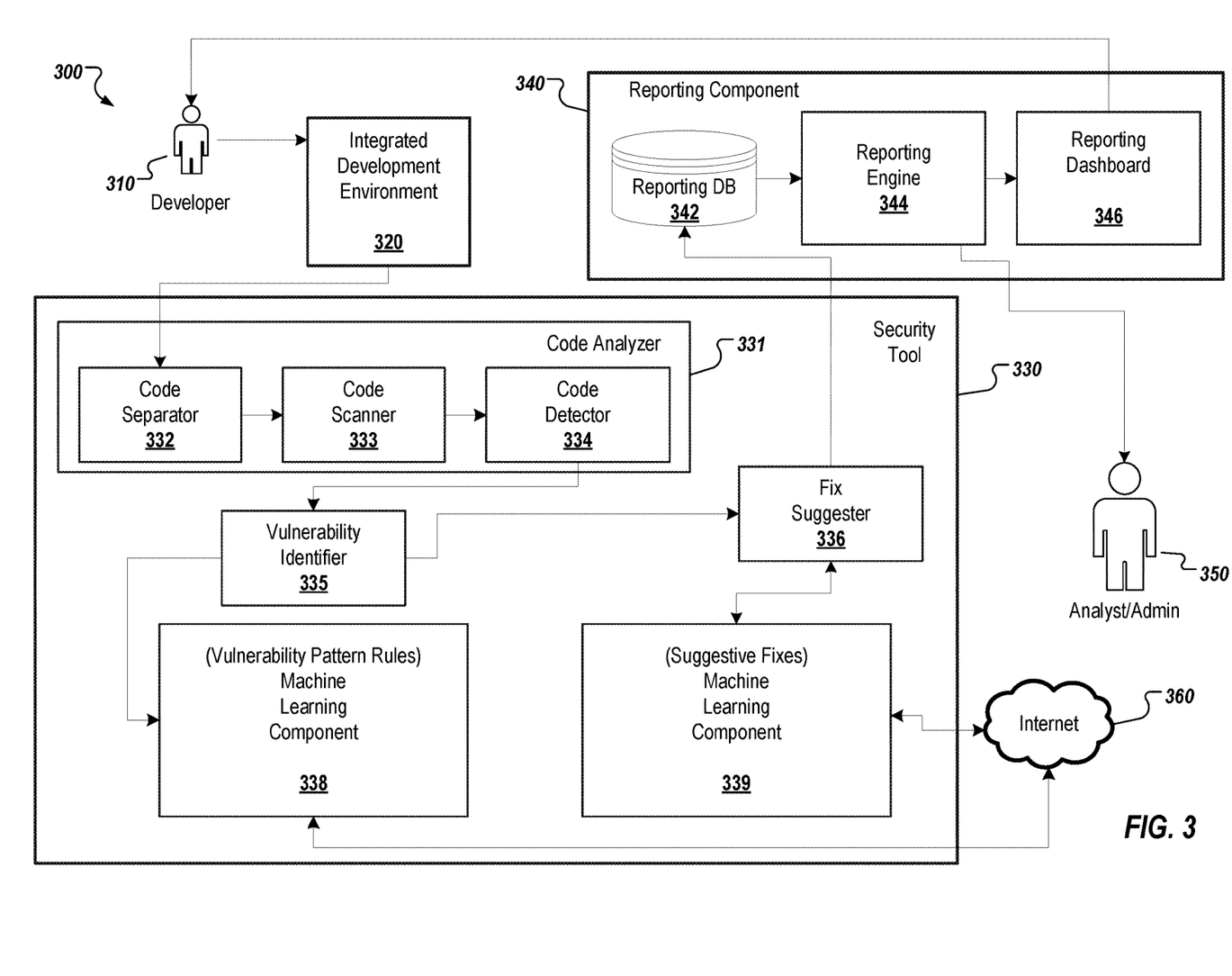
FIG. 3 depicts yet another example system that employs the iSPAC framework.
Figure 4:
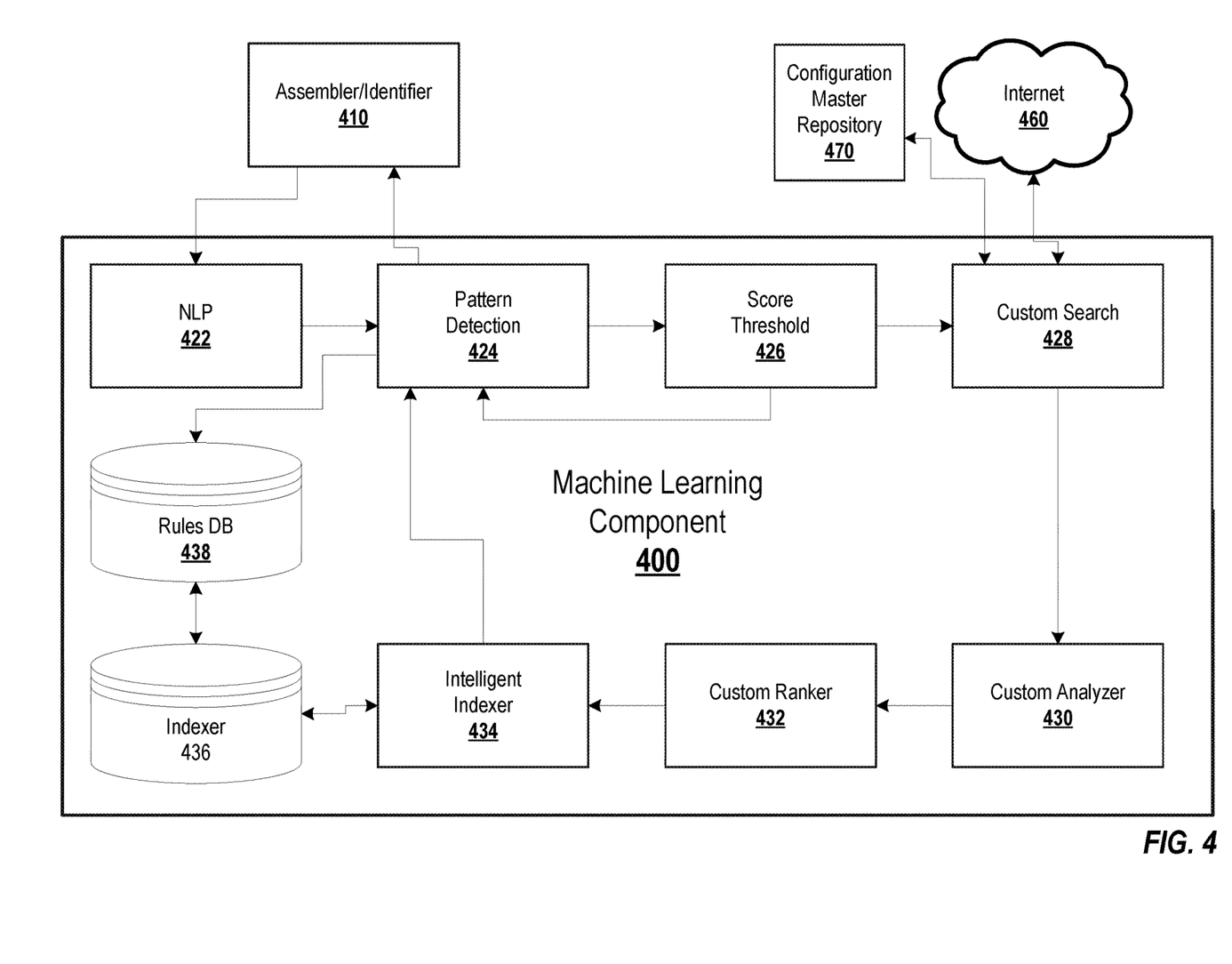
FIG. 4 depicts an example machine learning component employed within an iSPAC framework system for automating analytical model building of code snippets.

Machine learning component 239 is described in greater detail in FIG. 4 and is substantially similar to machine learning components 338 and 339 of FIG. 3. As depicted in FIG. 2, machine learning component 239 is implemented to address code recognition and context of code generation engine 230. Reporting component 240 includes reporting database 242, reporting engine 244, and reporting dashboard 246. In various implementation, reporting database 242 may be a rational database, such as Oracle or DB2, implemented on an enterprise database server or virtual server.

In the depicted example, developer 210 may provide software instructions indicating a functionality of a software component in the form of a request for a code snippet (code request) from integrated development environment 220. The code request may provide, in natural language, a specific annotation of functionally along with relevant architectures, programming languages, and environmental requirements for a code snippet, template or stub. For example, developer 210 may provide in an annotation to "expose micro services" using, for example, a spring micro service module, Security Assertion Markup Language (SAML) Integration, Authentication, String Analyzer, Bean mapping, validation framework, and so forth. Additional and/or alternatively, developer 210 may select an annotation from a predefined annotations list like "@SAMLParser," "@SpringBootMicroservices" as an input.

The integrated development environment 220 may send the code request to auto-code analyzer module 231. Code category identifier submodule 232 parses the received annotation to determine relevant keywords (tags) within the code request. The tags are used to identify a relevant category(ies) for the code request from a defined list of categories supported by the respective implementation of the iSPAC framework. In some implementations, categories may be determined based on a configurable predefined list, which may be updated periodically based on projects input and any new code suggestions. The category information along with recently generated code snippet for each category is provided to development environment 220 through code selector 233. Categories along with the recently generated code snippet for each category may be displayed for selection in development environment 220 based on project archtype (e.g., project location to refer project libraries). In some implementations, the recently generated code snippet for each category made be determined based on the records in reporting DB 242. Developer 210 may select categories and respective snippets to provide additional information regarding the provided annotation. In some implementations, may selected one of the provided coding snippets from a category and proceed with development without the use of machine learning component 239.

The selected information is provided to template matcher submodule 234. Template matcher module 234 provides the identified tags and category to machine learning component 239. Machine learning component 239 scores relevant code snippet matches in a repository and may initiate a search of the Internet 260 based on score values and determine thresholds. Machine learning component 239 is explained in greater detail in FIGS. 4 and 5. Machine learning component 239 returns relevant code snippets to pattern selector module 236 based on the results for the provided tags and category with a score that meets the determined threshold. Pattern selector module 236 provides the relevant code snippets returned from machine learning component 239 along with any recent code snippets from reporting database 242 to the developer 210 option for selection through the integrated development environment 220. Pattern selector module 236 also logs the request code in reporting database 242. Based on the selection of a particular code snippet by developer 210, the confidence updater module 237 persists the selection in reporting database 242 and within the machine learning component 239 for future use.

In various implementations, reporting engine 242 is employed to fetch historical code generation from reporting database 242. Analyst/Administrator 250 may employ reporting engine 244 to review generation history and provide analysis to relevant business and technical units within a respective enterprise. Additionally, developer 220 may use reporting dashboard 246 to review current code implementation and/or code generation history for particular categories of development.

FIG. 3 depicts an example system 300 that employs the iSPAC framework. The example system 300 includes components and actors that are substantially similar and function in a similar manner to the components of system 100, such as developer 310, integrated development environment 320, security tool 330, reporting component 340, analyst/administrator 350, and a link to the Internet 360. In depicted example, security tool 330 includes code analyzer module 331, which includes the submodules code separator 332, code scanner 333, and code detector 334; vulnerability identifier module 335; fix suggester module 336; machine learning components 338 and 339. Machine learning component 338 are described in greater detail in FIG. 4 and are substantially similar to machine learning component 228 of FIG. 2. As depicted in FIG. 3, machine learning component 338 is implemented to address problem pattern (i.e., vulnerabilities) rules recognition while machine learning component 339 is implemented to address suggestive fixes within security tool 330. Reporting component 340 includes reporting database 242, reporting engine 244, and reporting dashboard 246 (similar to FIG. 2). In various implementations, reporting database 342 may be a rational database, such as Oracle or DB2, implemented on an enterprise database server or virtual server.

In the depicted example, developer 310 checks in a code snippet in a source code repository through integrated development environment 320. Code analyzer module 331 fetches the snippet from the repository based on a request or automatically based on a trigger (e.g., from the check-in event or a time based scheduler). Code separator submodule 332 parses and separates the checked code snippet based on, for example, annotations or code markers into code blocks, which are sent to code scanner submodule 333. Code scanner submodule performs pattern matching on each separated block of code from the code snippet.

The results are passed to code detector submodule 334, which identifies or classifies each respective code block into a type or category marker (e.g., database invocation, web services, form elements, form interactions to be filled in by the end user, external integrations, message handling, etc.) based on a match with standard or example code samples. For example, if a checked-in snippet is written in Java, the code detector may identify a code block as relating to Java Database Connectivity (JDBC), Java Message Service (JMS), web-sockets, or other detectable functionality. Each of the identified code block, along with its respective category marker, will be provided to vulnerability identifier module 335, which passes the respective information to machine learning component 338. Machine learning component 338 scores relevant security rule matches in a repository and may initiate a search of the Internet 360 based on score values and determine thresholds to determine security vulnerabilities in each code block. Machine learning component 338 is explained in greater detail in FIGS. 4 and 5. Machine learning component 338 returns the security vulnerabilities identified for each code block based on the provided category information to vulnerability identifier module 335, which provides the information to fix suggester module 336.

For each of the identified security vulnerabilities for a respective code block, fix suggester module 336 provides relevant information to machine learning component 339. Machine learning component 339 scores relevant fixes for each identified vulnerabilities and may initiate a search of the Internet 360 based on score values and determine thresholds. Machine learning component 339 is explained in greater detail in FIGS. 4 and 5. Machine learning component 339 returns suggestions for updates to each code block to address the respective vulnerabilities to fix suggester module 336, which persist the update suggestion with each corresponding vulnerability and code block in reporting database 342. In some implementations, the fix suggester module 336 may apply suggested updates to a respective code block in the source code repository based on a threshold score and permission from the developer 310 or system administrator.

In various implementations, reporting engine 342 is employed to fetch historical code scanning from reporting database 342. Analyst/Administrator 350 may employ reporting engine 244 to review scanning and suggested update history and provide analysis to relevant business and technical units within a respective enterprise. Analyst/Administrator 350 may be a quality assurance administrator that may use the reports provided from reporting engine 344 to test and check code quality. Additionally, developer 320 may use reporting dashboard 346 for current scan results and suggested code updates.

FIG. 4 depicts an example machine learning component 400 employed within an iSPAC framework system, such as example systems 100, 200, and 300, for automating analytical model building of code snippets. Machine learning component 400 is substantially similar to machine learning components 328, 338, and 339 from FIGS. 2 and 3. In depicted example, machine learning component 400 includes natural language processing (NLP) module 422, pattern detection module 424, score threshold module 426, custom search 428, custom analyzer 430, custom ranker 432, intelligent indexer 434, indexer database 436, and rules database 348. In various implementation, indexer database 436, and rules database 348 may be a rational database, such as Oracle or DB2, implemented on an enterprise database server or virtual server. Assembler/Identifier module 410 represents a module that sends information to and receives information from machine learning component 400, such as template matcher module 235 from FIG. 2 and vulnerability identifier module 335 and fix suggester module 336 from FIG. 3.

In the depicted example, assembler/identifier 410 provides NLP module 422 with the relevant information (e.g., identified tags, code block, vulnerabilities) to be processed by machine leaning component 400. For example, such as template matcher module 235 in FIG. 2, assembler/identifier 410 may provide NLP module 422 with an identified tag(s) and corresponding category(ies). As another example, such as vulnerability identifier module 335 or fix suggester module 336 in FIG. 3, assembler/identifier 410 may provide NLP module 422 with an identify code block(s) or an identified security vulnerability(ies) in a code block. NLP module 422 performs NLP on the received input based on machine learning and examines and uses patterns in data to improve the modules understanding of the data. For example, NLP module 422 may derive plausible logical set of keywords and narrow phrases based on the received input.

The NLP module 422 provides the NLP output (e.g., keywords or tags) to pattern detection module 424. Pattern detection module 424 processes the output of the NLP, identifies relevant keywords (tags) in the data and queries the rules database 438 for potential matches. For example, when the machine leaning component 400 is configured to receive input from a pattern detection module, such as pattern detection module 424, within a code generation engine, such as code generation engines 124 and 230, the rule database 438 may contain code snippets indexed according to a corresponding function and/or a category(ies). In a similar manner, when the machine leaning component 400 is configured to receive input from a vulnerability identifier module, such as vulnerability identifier module 335, within a security tool, such as security tools 126 and 330, the rules database 438 may contain potential vulnerabilities indexed according associated coding block, code type, and/or functionality. Similarly, when the machine leaning component 400 is configured to receive input from a fixer suggester module, such as fix suggester module 336, within a security tool, such as security tools 126 and 330, the rules database 438 may contain potential fixes for vulnerabilities that are indexed according to associated coding block, code type, and/or corresponding vulnerability addressed. Pattern detection module 424 queries the rules database 438 for potential matches (e.g., code snippets, vulnerabilities, vulnerability fixes) for the request based on the NLP output.

Pattern detection module 424 provides the potential matches found in rules data base 438 to scorer threshold module 426, which scores the matched records based on the relevancy of each record to the provided information. In some implementations, score values may be increased based on the number of duplicate or similar matching records found.

The scorer threshold module 426, determines the number of matched records that meet a threshold. In some implementation, the threshold is configurable and may be increased proportional to the training the machine leaning component 400 has received (e.g., the amount of data collected in the rules database). When the number of scored matched records meet a configurable amount, the scorer threshold module 426 returns the matched records having a score above the threshold to the pattern detection module 424, which in turn return the records as a result set to assembler/identifier module 410. When the number of scored matched records does not meet the amount, scorer threshold module 426 provides the NLP output to custom search module 428.

Custom search module 428, may use the received NLP output to a link to the Internet 460 for possible matches (e.g., code snippets, vulnerabilities, vulnerability fixes). Searches may be customized through a developer IDE and may also be executed on an organization wide repository, such as master configuration repository 470. Custom search module 428 provides the search result to custom analyzer module 430, which performs analysis on the search results to determine, for example, the relevance of the results and the number of relevant results. Custom analyzer module 430 may adjust the configurable threshold for the results set based on the analysis.

Once the results have been analyzed and the threshold adjusted, the custom analyzer module 430 sends the search results to custom ranker module 432. Custom ranker module 432, scores the results based on the relevancy of each record to the provided information and compares the score to the configurable threshold. Based on the number of scored results that meet the threshold, custom search module 428 may perform an additional search or, conversely, the results that meet the configurable threshold may be passed to intelligent indexer module 434. Intelligent indexer module 434, persists the results that meet the threshold in indexer database 436, which indexes of the results found for faster searching. Intelligent indexer module 434, provides the relevant results to having a score above the threshold to the pattern detection module 424, which in turn returns the results along with any records found in rules database 438 as a result set to assembler/identifier module 410.

Figure 5:
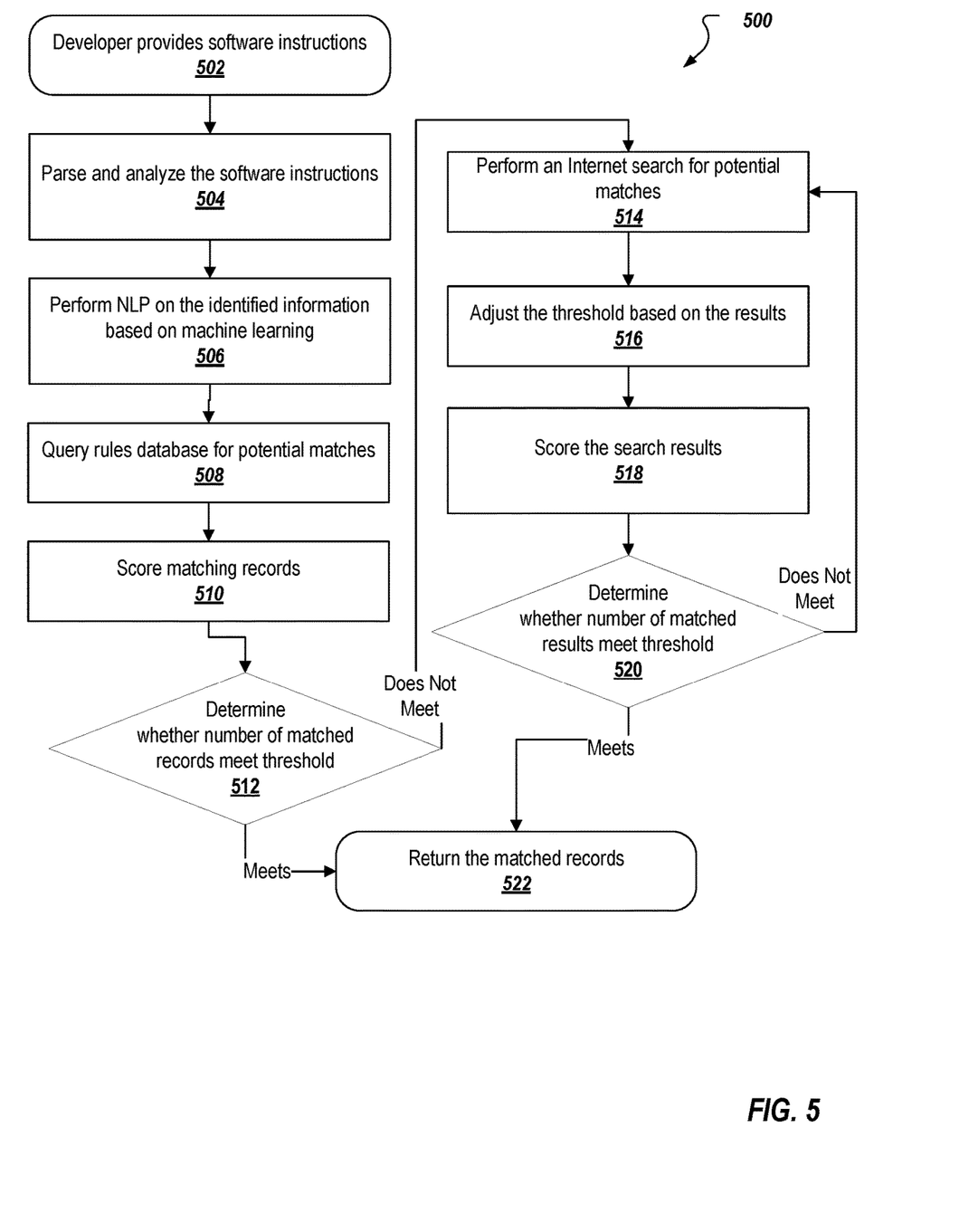
FIG. 5 depicts a flow diagram of an example process for employing a machine learning component within an iSPAC framework system to automate analytical model building of code snippets

FIG. 5 depicts a flow diagram of an example process (500) for employing a machine learning component, such as machine learning component 400, within an iSPAC framework system, such as systems 100, 200, and 300, to automate analytical model building of code snippets. A developer provides (502) software instructions indicating a functionality of a software component to the iSPAC framework via an integrated development environment interface. For example, the developer may provide a specific annotation request for code or check in a code snippet to a source code repository. Modules in the iSPAC framework system parse and analyze (504) the software instructions, such as described in FIGS. 2 and 3, to identify relevant information, such as tags, code block, and vulnerabilities. The NLP module performs (506) NLP on the identified information based on machine learning in which keywords (tags) and patterns are identified and examined and then used to improve the understanding of the information. The pattern detection module queries (508) a rules database for potential matches (e.g., code snippets, vulnerabilities, vulnerability fixes). A scorer threshold module scores (510) the matching records based on the relevancy of each record to the provided software instructions and determine (512) the number of matched records that meet a threshold. When the number of scored matched records that meet the threshold exceed a configurable amount, the matched record that meet the threshold are returned (522) to the developer and/or stored in a reporting database to be processed at a later time and the process ends. When the number of scored matched records that meet the threshold does not meet the configurable amount, a custom search module performs (514) an Internet search for potential matches (e.g., code snippets, vulnerabilities, vulnerability fixes). A custom analysis module (516) may adjust the threshold based on the results. A custom ranker module scores (518) each of the search results based on the relevancy of each result to the provided software instructions and compares (520) the scores to the threshold. When the number of scored results does not meet a configurable amount, the custom search module performs (514) an additional Internet search for potential matches. When the number of scored results meets the configurable amount, an intelligent indexer module persists (522) the results that meet the configurable threshold in an indexer data base. The matches records that meet the threshold from both the Internet search and the rules database are returned (524) to the developer and/or stored in a reporting database to be processed at a later time and the process ends.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, Application Programming Interface (API) or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for automating analytical model building for code snippets, the method being executed by one or more processors and comprising:
   receiving, from an integrated development environment (IDE), software instructions comprising one or more annotations including plaintext code requirements indicating functionality of a software component;
   analyzing, by a code category identifier sub-module of an auto-code analyzer module, the software instructions through natural language processing (NLP) to parse at least one annotation to provide at least one tag that is used to identify one or more code categories determined for the software instructions to characterize the software instructions and the functionality;

querying a rules database for one or more code snippets based on one or more of the at least one tag and the one or more code categories;

receiving a query result comprising a set of code snippets; and determining that a number of code snippets in the set of code snippets does not meet a threshold number of code snippets, and in response:
  performing a search, based on the identified tags, of relevant Internet sites to identify code snippets that address the functionality, each code snippet corresponding to a code category of the one or more code categories;
  processing the code snippets using a machine learning component to determine a score value for each of the code snippets based on respective code categories and a respective relevance to the functionality, the machine learning component trained using previously selected code snippets persisted to the rules database;
  based on the score values of the code snippets, determining that at least one of the code snippets has a score value that meets a relevance threshold; and
  providing, to the IDE, the at least one of the code snippets based on the determination that the at least one of the code snippets has the score value that meets the relevance threshold.

2. The computer-implemented method of claim 1 further comprising:
  receiving, from the IDE, a selection of the provided at least one of the code snippets; and
  based on receipt of the selection, persisting, in the rules database, the selected code snippet.

3. The computer-implemented method of claim 2 further comprising:
  receiving second software instructions indicating second functionality of a second software component;
  analyzing the second software instructions through NLP to identify second tags to characterize the second software instructions and the second functionality;
  performing a second search, based on the identified second tags, of the rules database to identify relevant code snippets from the previously selected code snippets that perform the functionality;
  processing the relevant previously selected code snippets using the machine learning component to determine a score value for each of the relevant previously selected code snippets based on a respective relevance to the functionality;
  based on the score value of the relevant previously selected code snippets, determining that at least one of the relevant previously selected code snippets has a score value that meets a relevance threshold; and
  providing, to the IDE, the at least one of the relevant previously selected code snippets based on the determination that the at least one of the relevant previously selected code snippets has the score that meets the relevance threshold.

4. The computer-implemented method of claim 2 further comprising:
  updating the relevance threshold based on the persistence of the relevant previously selected code snippet in the rules database.

5. The computer-implemented method of claim 1, wherein the software instructions are received based on the software component being checked in to a source code repository associated with the IDE, wherein the functionality of the software component indicates a security vulnerability of the component, and wherein the identified code snippets are directed to fixing the security vulnerability.

6. The computer-implemented method of claim 5 further comprising:
  updating the software component with the code snippet having a most relevant score for addressing the security vulnerability.

7. The computer-implemented method of claim 5 further comprising:
  receiving, from the IDE, a selection of the provided at least one of the code snippets;
  updating the software component with the selected code snippet; and
  persisting, in the rules database, the selected code snippet for use in subsequent searches.

8. The computer-implemented method of claim 1, wherein the software instructions are in natural language and include a specific annotation of the functionality.

9. The computer-implemented method of claim 1, wherein performing the search of relevant Internet sites to identify code snippets that address the functionality comprises performing a search to identify code snippets that perform the functionality.

10. The computer-implemented method of claim 1, wherein the software instructions are code blocks, and wherein performing the search of relevant Internet sites to identify code snippets that address the functionality comprises performing a search to identify code snippets that identify vulnerabilities in the functionality.

11. One or more non-transitory computer-readable storage media coupled to one or more processors and having instructions stored thereon which, when executed by the one or more processors, cause the one or more processors to perform operations for automating analytical model building for code snippets, the operations comprising:
  receiving, from an integrated development environment (IDE), software instructions comprising one or more annotations including plaintext code requirements indicating functionality of a software component;
  analyzing, by a code category identifier sub-module of an auto-code analyzer module, the software instructions through natural language processing (NLP) to parse at least one annotation to provide at least one tag that is used to identify one or more code categories determined for the software instructions to characterize the software instructions and the functionality;
  querying a rules database for one or more code snippets based on one or more of the at least one tag and the one or more code categories;
  receiving a query result comprising a set of code snippets; and
  determining that a number of code snippets in the set of code snippets does not meet a threshold number of code snippets, and in response:
    performing a search, based on the identified tags, of relevant Internet sites to identify code snippets that address the functionality, each code snippet corresponding to a code category of the one or more code categories;
    processing the code snippets using a machine learning component to determine a score value for each of the code snippets based on respective code categories and a respective relevance to the functionality, the machine learning component trained using previously selected code snippets persisted to the rules database;

based on the score values of the code snippets, determining that at least one of the code snippets has a score value that meets a relevance threshold; and providing, to the IDE, the at least one of the code snippets based on the determination that the at least one of the code snippets has the score value that meets the relevance threshold.

12. The computer-readable storage media of claim 11 further comprising:

receiving, from the IDE, a selection of the provided at least one of the code snippets; and based on receipt of the selection, persisting, in the rules database, the selected code snippet.

13. The computer-readable storage media of claim 11, wherein the software instructions are received based on the software component being checked in to a source code repository associated with the IDE, wherein the functionality of the software component indicates a security vulnerability of the component, and wherein the identified code snippets are directed to fixing the security vulnerability.

14. The computer-readable storage media of claim 13 further comprising:

updating the software component with the code snippet having a most relevant score for addressing the security vulnerability.

15. The computer-readable storage media of claim 13 further comprising:

receiving, from the IDE, a selection of the provided at least one of the code snippets;

updating the software component with the selected code snippet; and persisting, in the rules database, the selected code snippet for use in subsequent searches.

16. A system, comprising:

one or more processors; and a computer-readable storage device coupled to the one or more processors and having instructions stored thereon which, when executed by the one or more processors, cause the one or more processors to perform operations for automating analytical model building for code snippets, the operations comprising:

receiving, from an integrated development environment (IDE), software instructions comprising one or more annotations including plaintext code requirements indicating functionality of a software component;

analyzing, by a code category identifier sub-module of an auto-code analyzer module, the software instructions through natural language processing (NLP) to parse at least one annotation to provide at least one tag that is used to identify one or more code categories determined for the software instructions to characterize the software instructions and the functionality;

querying a rules database for one or more code snippets based on one or more of the at least one tag and the one or more code categories;

receiving a query result comprising a set of code snippets; and determining that a number of code snippets in the set of code snippets does not meet a threshold number of code snippets, and in response:

performing a search, based on the identified tags, of relevant Internet sites to identify code snippets that address the functionality, each code snippet corresponding to a code category of the one or more code categories;

processing the code snippets using a machine learning component to determine a score value for each of the code snippets based on respective code categories and a respective relevance to the functionality, the machine learning component trained using previously selected code snippets persisted to the rules database;

based on the score values of the code snippets, determining that at least one of the code snippets has a score value that meets a relevance threshold; and providing, to the IDE, the at least one of the code snippets based on the determination that the at least one of the code snippets has the score value that meets the relevance threshold.

17. The system of claim 16 further comprising:

receiving, from the IDE, a selection of the provided at least one of the code snippets;

based on receipt of the selection, persisting, in the rules database, the selected code snippet; and updating the relevance threshold based on the persistence of the relevant previously selected code snippet in the rules database.

18. The system of claim 16, wherein the software instructions are in natural language and include a specific annotation of the functionality.

19. The system of claim 16, wherein performing the search of relevant Internet sites to identify code snippets that address the functionality comprises performing a search to identify code snippets that perform the functionality.

20. The system of claim 16, wherein the software instructions are code blocks, and wherein performing the search of relevant Internet sites to identify code snippets that address the functionality comprises performing a search to identify code snippets that identify vulnerabilities in the functionality.

* * * * *